United States Patent
Briggs et al.

(10) Patent No.: US 7,346,642 B1
(45) Date of Patent: Mar. 18, 2008

(54) ARITHMETIC PROCESSOR UTILIZING MULTI-TABLE LOOK UP TO OBTAIN RECIPROCAL OPERANDS

(75) Inventors: Willard S. Briggs, Boulder, CO (US); David W. Matula, Dallas, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 710 days.

(21) Appl. No.: 10/714,554

(22) Filed: Nov. 14, 2003

(51) Int. Cl.
*G06F 7/38* (2006.01)
(52) U.S. Cl. ............... 708/497; 708/500; 708/605
(58) Field of Classification Search ............ 708/500, 708/502, 605
See application file for complete search history.

(56) References Cited

U.S. PATENT DOCUMENTS

| 4,823,301 | A | * | 4/1989 | Knierim | 708/650 |
| 5,068,816 | A | * | 11/1991 | Noetzel | 708/270 |
| 6,256,653 | B1 | * | 7/2001 | Juffa et al. | 708/290 |
| 6,581,085 | B1 | * | 6/2003 | Yue et al. | 708/502 |
| 7,117,238 | B1 | * | 10/2006 | Foskett et al. | 708/502 |
| 7,124,161 | B2 | * | 10/2006 | Choo et al. | 708/502 |
| 2001/0027461 | A1 | * | 10/2001 | Peterson | 708/654 |

OTHER PUBLICATIONS

P. Michael Farmwald, "High Bandwidth Evaluation of Elementary Functions," S-1 Project, Lawrence Livermore National Laboratory, pp. 139-142.

* cited by examiner

*Primary Examiner*—Tan V. Mai

(57) ABSTRACT

Methods for determining the square root, reciprocal square root, or reciprocal of a number performed by a processor of a computer system. The methods produce high precision estimates without using iterative steps. In addition, the methods taught herein utilize compressed tables for the coefficient terms A, B, and C from the quadratic expression $Ax^2+Bx+C$, thus minimizing hardware requirements.

15 Claims, 4 Drawing Sheets

ARITHMETIC PROCESSOR UTILIZING MULTI-TABLE LOOK UP TO OBTAIN RECIPROCAL OPERANDS

BACKGROUND

1. Field of the Disclosure

The present disclosure generally relates to computer systems, and more particularly to a computer system providing results of arithmetic operations.

2. Description of the Related Art

A computer processor performs arithmetic operations on different types of numbers, or operands. For example, the simplest operations involve integer operands, which are represented using a "fixed-point" notation. Non-integers are typically represented according to a "floating-point" notation.

Many processors handle floating-point operations within a floating-point unit (FPU). Floating-point processing typically includes addition, multiplication and division operations, may also include other special mathematical operations on a single operand, such as the square root ($\sqrt{x}$), reciprocal square root ($1/\sqrt{x}$), and reciprocal ($1/x$) representing functions.

Floating point units (and other arithmetic processors) commonly use multiplier based algorithms for division. These division algorithms initially employ a seed reciprocal of the divisor provided by a lookup table system.

The seed reciprocals have a selected number of bits of accuracy. Iterative multiplies are performed to iteratively increase the accuracy of the reciprocal approximation allowing a final quotient value of predetermined accuracy to be obtained.

The seed reciprocals are typically obtained from a ROM reciprocal look-up table, or equivalent PLA (programmed logic array). The number of table input index bits and table output bits of the seed reciprocals determines the size of the look-up table. More input bits allowing more bits of accuracy in the seed reciprocals reduces the necessary number of iterative multiply cycles, reducing division time, albeit at the cost of exponential growth in the reciprocal table size.

It will be appreciated that a floating point system or method that reduces the needed number of index bits and that reduces or eliminates the need for iterative cycles in resolving operations such as reciprocal, square root, and reciprocal square root would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

The present disclosure is directed to a method for evaluating arithmetic expressions, such as the square root, reciprocal square root, or reciprocal of a number, performed by a processor of a computer system. The processor evaluates the expressions using the quadratic equation $$Ax^2+Bx+C,$$

where the coefficient terms A, B, and C, are supplied by three coefficient lookup tables responsive to a common input as disclosed herein. The method results in high precision estimates without the use of iterative steps. In addition, the method taught herein uses compressed, or smaller, tables for the coefficient terms A, B, and C, thus minimizing the hardware requirements.

Figure 1:
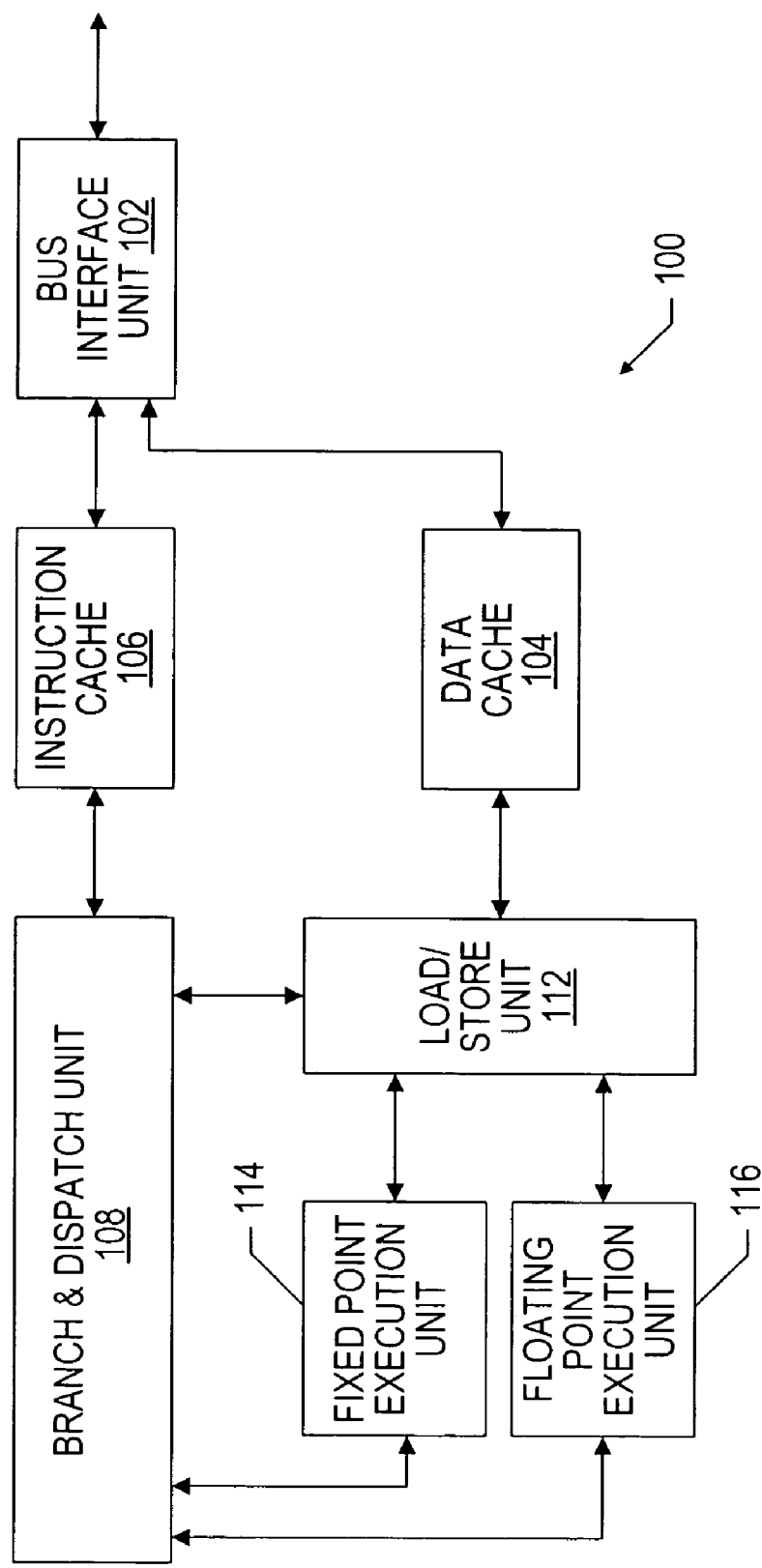
FIG. 1 illustrates a block diagram of one embodiment of a processor in which an embodiment of the present disclosure may be implemented.

FIG. 1 illustrates a block diagram of one embodiment of a processor 100 in which an embodiment of the present disclosure may be implemented. While the present invention may be understood with reference to FIG. 1, this reference should not be construed in a limiting sense.

Processor 100 includes a bus interface unit 102 that controls the flow of data between processor 100 and the remainder of the data-processing system (not shown). Bus interface unit 102 is connected to both a data cache 104 and an instruction cache 106 for purposes of illustration. Instruction cache 106 supplies instructions to branch and dispatch unit 108. Branch and dispatch unit 108 determines the sequence of instructions based on current data locations and the availability of load/store unit 112, fixed-point execution unit 114, and floating-point execution unit 116, and the nature of the instructions themselves. Branch and dispatch unit 108 issues the individual instructions to the appropriate logic unit (i.e. load/store unit 112, fixed-point execution unit 114, and floating-point execution unit 116), which in turn function together to implement request operations.

Those skilled in the art will appreciate that the details of either the construction of processor 100 or its operation may vary depending on the objectives influencing the design. For example, processor 100 may include register renaming multiple fixed-point execution units 114 for executing fixed-point instructions without data dependencies in parallel, or a memory management unit regulating the content of data cache 104 and a second level (L2) cache (not shown) outside processor 100.

Figure 2:
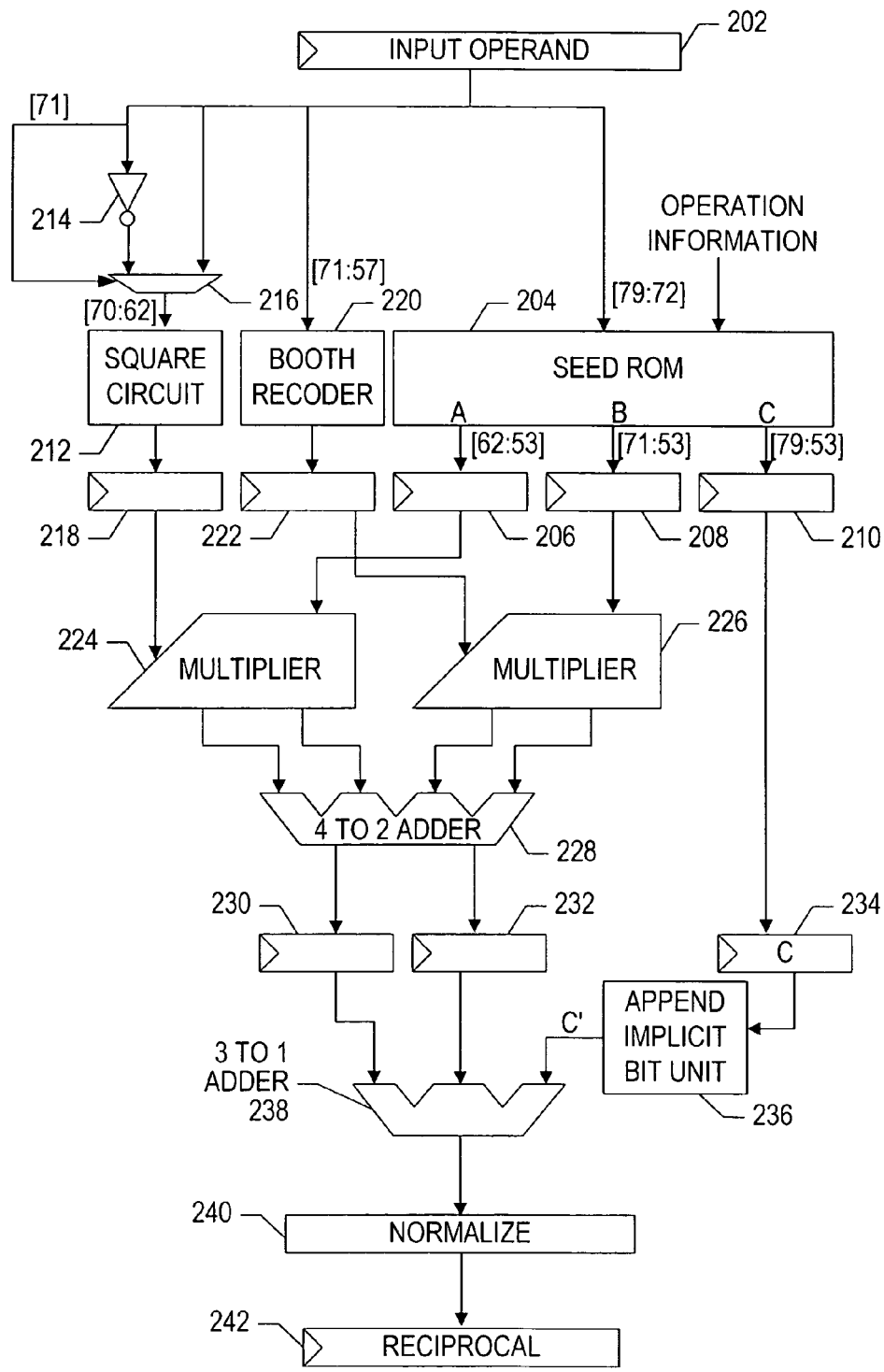
FIG. 2 illustrates a block diagram of a portion of a floating point unit (FPU) according to an embodiment of the present disclosure.

In one embodiment, floating-point execution unit 116 comprises selecting three input operands (A, B, and C) from tables to allow for the implementation of floating point rounded monotonic quadratic functions based on a monotonic operation. For example, the tables can provide values to support providing a floating point rounded monotonic reciprocal function. FIG. 2 illustrates a specific pipelined architecture for implementing, accessing, and using values stored in such tables. Information regarding generation of the tables to be stored in FIG. 3 to support floating point rounded monotonic functions is described subsequent to FIG. 2.

FIG. 2 illustrates a block diagram of a portion of a high precision floating point unit (FPU) according to an embodiment of the present disclosure. The most significant bits of an input operand 202, the eight most significant bits for example, are used to index a seed read only memory (ROM) 204. It will be appreciated that operation information can also be used to index seed ROM 204. Operation information can include identification of various of operations, such as reciprocal or square root reciprocal. ROM 204 is part of a table look-up system that stores multiple component tables. For example, the ROM 204 can include tables to provide operands A, B, and C to be stored in registers 206, 208, and 210, respectively. The generation of the values contained in seed ROM 204 is discussed below.

One advantage of the implementation described herein is that the tables stored within ROM 204 can be accessed using a single index value having one-third the number of bits of the floating point result generated. For example, for a 24-bit result accurate to a Unit in the Last Place (ULP), only an eight-bit index is needed. The ability to provide this level of precision in the result using a ROM table of this size is advantageous.

Mid-range bits of input operand 202 are used to determine a nine-bit input to the square circuit 212, which may be a ROM or comprise a small multiplier, and a Booth recoding. Inverter 214 and multiplexer 216 are utilized to reduce the size of square circuit 212 by substantially one half, which is discussed in greater detail later in this disclosure. The operand output of square circuit 212 is stored in Booth recoded format in register 218 for input to a multiplier.

The least significant bits of input operand 202 are input to Booth recoder 220. The output of Booth recoder 220 is stored in register 222 for input to a multiplier.

Note that in the specific implementation illustrated, that the ROM table 204 is indexed by a portion of bits of the input operand that represent the operand's higher order bits. In addition, the ROM 204 is coupled to receive index bits that are mutually exclusive to the bits used to access the squaring circuit 212 and Booth recoder 220. However, the square circuit 212 and Booth recoder 220 are coupled to receive common, or overlapping, bits. While the portions of the input operand received at the ROM 212, ROM 204 and recoder 220 are illustrated as being adjacent bit sequences, they may be non-adjacent bit sequences in other embodiments.

Operand A from register 206 and the operand from register 218 are multiplied by multiplier 224. Multiplier 224 can be a carry save multiplier with redundant outputs and no ripple carry. Operand B from register 208 and the operand from register 222 are multiplied by multiplier 226. Multiplier 226 can also be a carry save multiplier with redundant outputs and no ripple carry. The redundant carry save outputs of multipliers 224 and 226 are added by four-to-two adder 228 producing a redundant carry save representation of the $Ax^2+Bx$ term with the carry and sum values stored in registers 230 and 232, respectively. Operand C from register 210 is stored in register 234 to maintain a parallel pipeline. An implicit bit is appended to operand C from register 210 by appending implicit bit unit 236 forming operand C'. The carry and sum operands of the $Ax^2+Bx$ term are added together with operand C' by three-to-one adder 238. The output of adder 238 is normalized into the format specified for the floating point output, and the resulting reciprocal value is stored in reciprocal register 242.

Figure 3:
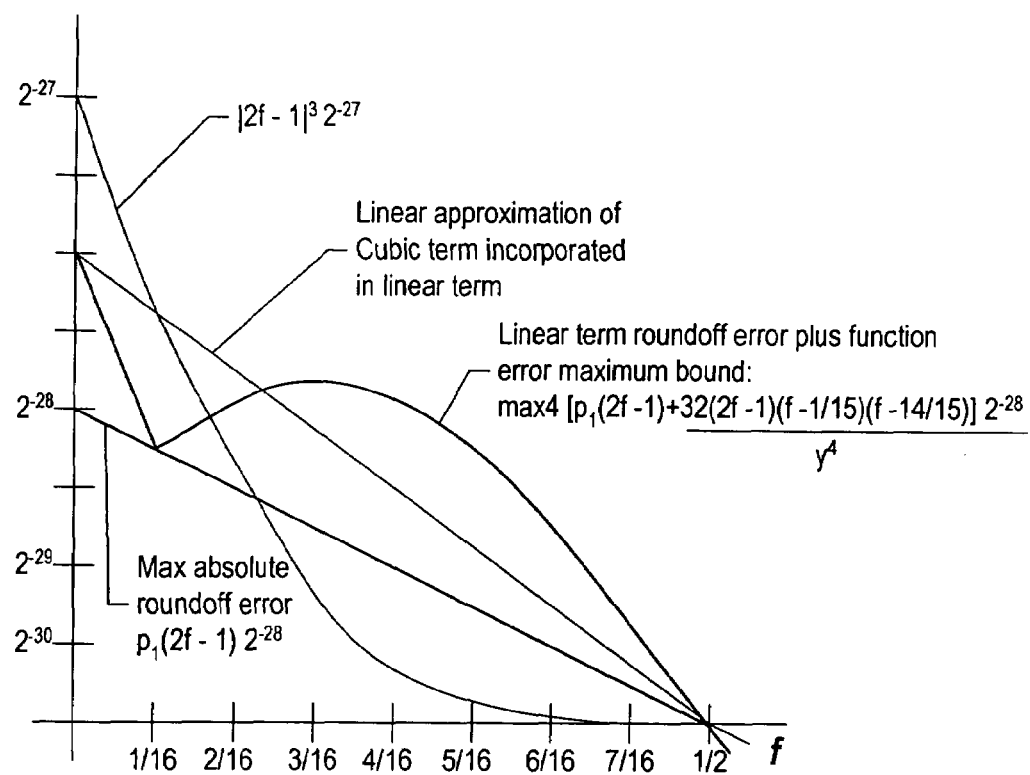
FIG. 3 illustrates a specific alignment of terms according to one embodiment of the disclosure.

FIG. 3 is a block diagram illustrating an alignment of terms according to at least one embodiment of the present disclosure. During the table lookup and recoding stage of operation, the 8 most significant bits (79:72) of the input operand 203, excluding the implicit bit 80, are used as the index into the table of ROM 204. Bits 9 through 23 (71:57) of the input operand are used in calculation of the Bx term, and bits 9 through 18 (71:62) are used to access ROM 212 to calculate the $x^2$ component. A further step is used to permit the squaring circuit to be reduced in size. By centering the effect of the squared term, the size of the table used to calculate the square can be reduced by half by using what was formerly the most significant bit to invert the index into table. Since the square input is used as a multiplier input, the data that is stored in a ROM implementation of the squaring circuit can be precomputed recoded to the format expected by the multiplier, thus removing a Booth recoder from the path. The x input to the Bx term is recoded in this stage.

In the multiply or second stage, both products are calculated in carry save multipliers. The results for both products are added together in a 4 to 2 adder, and the redundant result is passed to the add stage.

In stage three, or the add stage, an implicit bit is appended to the front of the C term. The two parts of the redundant number from the multiply stage are added with the C term to form the result. The values stored in the seed ROM are chosen to provide a rounded function as the result, when truncated to the output precision size during normalization. The rounded result is normalized in normalize block 240. For the reciprocal, square root reciprocal, and square root functions, the normalization comprises forcing the output to an exact power of two if a carry out is detected from the adder stage. The normalize unit also removes the implicit bit before storing the result in the output register 242.

The tables stored in ROM 204 are chosen to allow for implementing a floating point rounded monotonic quadratic function based on a monotonic operation. Specifics of generating the tables of ROM 204 are described below.

Table Compression

A monotonic operation applied to a single operand is a monotonic function of that operand. This is the case for the monotonic operations reciprocal, square root, and square root reciprocal. A monotonic function, as the term monotonic implies, is always changing in the same direction. A monotonic increasing function of a variable y increases or stays constant as y increases, but never decreases. A monotonic decreasing function of y decreases or stays constant as y increases, but never increases. Each term in a monotonic series is, in an increasing monotonic, greater than or equal to the one before it. Or, in a decreasing monotonic, less than or equal to the one before it.

A floating point rounded function over an interval has a discrete set of floating point inputs over that interval. The value of the floating point rounded function over the interval is a step function, with the steps decreasing or remaining the same as the floating point inputs increase for a decreasing monotonic floating point rounded function, and with the steps increasing or remaining the same as the floating point inputs increase for an increasing monotonic function.

It is sufficient for the reciprocal operation to consider floating point inputs over the interval [1, 2). Thus for example $y=1.b_1b_2 \ldots b_{23}$ provides the $2^{23}$ (about 8 million) input values for the 24 bit precision specified in the IEEE standard single precision format. For the square root and square root reciprocal operations it is necessary to consider two input binades covering [1, 4).

For evaluation of a floating point rounded polynomial function, such as the quadratic $A y^2+By+C$, where all coefficients A, B, C are determined from a leading bit portion such as $y_8=1.b_1b_2 \ldots b_8$ of y, the floating point rounded quadratic function is then a piecewise quadratic function, here having $2^8=256$ pieces over [1, 2).

The verification that such a floating point rounded quadratic function is monotonic can be verified by observing that each piece is monotonic and by verifying that the joining points of the pieces (here 255 in number) preserver monotonicity. This test confirming monotonicity as well as tests for the whole single precision range of 8-16 million cases for each reciprocal, reciprocal square root and square root reciprocal are easy to perform in addition to theoretical arguments from the level of accuracy and the derivatives of the function.

The simplicity of these tests allows perturbation of the coefficients to improve the percent round to nearest results or to reduce table size without losing the monotonicity or unit in the last place accuracy of the floating point rounded function realizing the monotonic operation.

The following paragraphs describe the calculations to provide an 8-bit y table solution for table compression such that a plurality of tables, three in our example, are indexed by an index value three times smaller bitwise than the floating point result, i.e., 8-bit tables produce a 24 bit floating point result.

Table Compression (8-bit y Table Solution)

Let $$y = \frac{1.b_1 b_2 \ldots b_8\ b_9 b_{10} \ldots b_{23}}{y_8\ f} = y_8 + f 2^{-8}, \text{ where} \quad (1)$$

$$y_8 = 1.b_1 b_2 \ldots b_8, \text{ and} \quad (2)$$

$$f = 0.b_9 b_{10} \ldots b_{23}(15 \text{ bits}), \text{ where } 0 \le f \le 1 - 2^{-15}. \quad (3)$$

The midpoint is then given by $$y_8 + 2^{-9} = 1.b_1 b_2.b_8, \quad (4)$$

and the center point by $$(2f-1) = (b_9 b_{10} \ldots b_{23}) - 1, \text{ where } -1 \le (2f-1) \le 1 - 2^{-14}. \quad (5)$$

Thus the expression for y is given by $$y = (y_8 + 2^{-9}) + (2f-1)2^{-9}. \quad (6)$$

The following identity for the reciprocal of y is given by the expression:

$$\frac{1}{y} = \frac{1}{y_8 + 2^{-9}} - \frac{(2f-1)}{y_8 + 2^{-9}} \frac{1}{y} 2^{-9} \quad (7)$$

The preceding equation (7) may be checked by placing terms over a common denominator.

Iterative substitution for 1/y two times yields a cubic expression in (2f-1) as follows:

$$\frac{1}{y} = \quad (8)$$

$$\underbrace{\frac{1}{y_8+2^{-9}}}_{A} - \underbrace{\frac{(2f-1)}{(y_8+2^{-9})^2}2^{-9}}_{-B2^{-9}} + \underbrace{\frac{(2f-1)^2}{(y_8+2^{-9})^3}2^{-18}}_{+C2^{-18}} - \underbrace{\frac{(2f-1)^3}{(y_8+2^{-9})^3}\left(\frac{1}{y}\right)2^{-27}}_{-D2^{-27}}.$$

Note the algebraic expression 8 is an exact equation for the reciprocal, where the first three terms can be evaluated to as much accuracy as desired by a lookup table indexed by 8-bits along with appropriate multiplications. Only the fourth term, which constitutes less than ⅛ of a unit relative to our target precision of 24-bits, needs to be approximated.

Tables for the A, B, and C coefficients for a reciprocal and a square root reciprocal which have been generated utilizing the mathematical methodology herein are presented in the Appendix.

Our invention employs several techniques to generate the coefficients $C_0, C_1, C_2$ of the rounded floating point function approx (1/y) to reduce table size and computation effort while maintaining the monotonicity property with unit in the last place (ulp) accuracy in realizing the reciprocal operation.

The coefficient $C_0$ includes the half ulp increment so that the final rounding occurs simply by truncating the result during normalization to the floating point output format.

The coefficient $C_2$ includes compensation for the rounding error in providing $C_0$, so that the total coefficient rounding errors from $C_0$ and $C_2$ are correlated to provide a net rounding error no worse than the worse case of a single rounding error, as described in co pending application Ser. No. 10/108,251, filed on Mar. 26, 2002, entitled APPARATUS AND. METHOD FOR MINIMIZING ACCUMULATED ROUNDING ERRORS IN COEFFICIENT VALUES IN A LOOKUP TABLE FOR INTERPOLATING POLYNOMIALS, naming inventor David W. Matula, which is incorporated herein by reference.

The coefficient of the linear term $C_1$ includes a linear approximation to the cubic term of equation 8 to increase the accuracy so as to reduce the table size for the final 3 coefficients $C_0, C_1, C_2$ of our floating point function approx (1/y).

Error Roundoff Methodology

If we let $$C_1 = RN_{18}\left(\frac{1}{(y_8+2^{-9})^2} + \frac{169/225}{(y_8+2^{-9})^3 y}2^{-18}\right) \text{ and } \rho_1 2^{-19} =$$

$$\left(\frac{1}{(y_8+2^{-9})^2} + \frac{169/225}{(y_8+2^{-9})^3 y}2^{-18}\right) - C_1$$

Then.

$$\frac{1}{y} = C_0 + C_2 Q 2^{-18} + \rho_a 2^{-28} + C_2 \rho_Q 2^{-28} + C_2(2f-1)\rho(f)2^{-27} +$$

$$C_1(2f-1)\rho(f)2^{-9} + (2f-1)\rho_1 2^{-28} + \left(\frac{\bar{f}}{\bar{y}^4}\right)2^{-29} + \partial' 2^{-28} \text{ where}$$

$$\bar{f} = 32\left(f - \frac{1}{2}\right)\left(f - \frac{1}{15}\right)\left(f - \frac{14}{15}\right), \text{ and } \partial' \text{ is less than 1.}$$

$$\bar{y}^4 = (Y_8 + 2^{-9})^3 y.$$

Let us define an approximation, $$approx\left(\frac{1}{y}\right),$$

in terms of our table lookup and multiply accumulate in finite precision by the expression:

$$approx\left(\frac{1}{y}\right) = C_0 + C_1(2f-1)2^{-9} + C_2 Q 2^{-18}$$

Then the error term identification is as follows:

$$\left(\frac{1}{y}\right) - approx\left(\frac{1}{y}\right) = $$
$$\rho_\alpha 2^{-28} + (2f-1)\rho_1 2^{-28} - \left(\frac{\bar{f}}{y^4}\right)2^{-29} + C_2\rho_Q 2^{-28} + C_2(2f-1)\rho(f)2^{-27}$$

Where the portion of the expression $\rho_\alpha 2^{-28}$ represents the even terms roundoff, the portion $$(2f-1)\rho_1 2^{-28} - \left(\frac{\bar{f}}{y^4}\right)2^{-29}$$

represents the odd terms roundoff and function termination, the portion $C_2\rho_Q 2^{-28}$ represents the squaring term roundoff, and the portion of the expression $C_2(2f-1)\rho(f)2^{27}$ represents the approximation error for the square.

The behavior of the portions of the error terms expression can be understood with reference to Table 1.

TABLE 1

Behavior of Error Terms

| $\rho_\alpha 2^{-28}$ | $(2f-1)\rho_1 2^{-28} - \left(\frac{\bar{f}}{y^4}\right)2^{-29}$ | $C_2\rho_Q 2^{-28}$ | $C_2(2f-1)\rho(f)2^{-27}$ |
|---|---|---|---|
| Essentially uniform over $(-1,1) \cdot 2^{-28}$, independent of y and f. | Sum can be correlated to be bounded by $\frac{5}{4}2^{-28}$. Non linear term diminishes rapidly with y→2. | Essentially $\frac{\rho_Q}{y^3}2^{-28}$. Damps rapidly with y→2. | Essentially $\frac{2f-1}{y^3}\rho(f)2^{-27}$. Damps rapidly with y→2 and $|2f-1|\to 0$. |

The damping of error terms can be understood with reference to Table 2.

TABLE 2

Error Term Damping

| Error Term | Un-restricted Upper Bound | y ≥ 1¼ Upper Bound | y ≥ 1½ Upper Bound | $|2f - 1| \leq$ ½ Upper Bound |
|---|---|---|---|---|
| $\rho_\alpha 2^{-28}$ | 1 | 1 | 1 | 1 |
| $(2f-1)\rho_1 2^{-28} - \left(\frac{\bar{f}}{y^4}\right)2^{-29}$ | 3/2 | 1.2 | 1.1 | 1 |
| $C_2\rho_Q 2^{-28}$ | 1 | 0.5 | 0.3 | 1 |
| $C_2(2f-1)\rho(f)2^{-27}$ | 2 | 1 | 0.6 | 1 |
| Independent Summation Bound (units) | 5.5 ($\times 2^{-28}$) | 3.7 ($\times 2^{-28}$) | 3 ($\times 2^{-28}$) | 4 ($\times 2^{-28}$) |

It is preferable to have $$\left|\left(\frac{1}{y}\right) - approx\left(\frac{1}{y}\right)\right| < 3.5 \cdot 2^{-28}.$$

The difficult cases should be found in the restricted range $1 \leq y \leq 5/4$, and $|2f-1| \geq 1/2$. The worst case compounding of all four errors above is unlikely given the relatively small number of cases. It should be noted that there are only about 64 values for $\rho_\alpha$ and $\rho_1$ over the range $1 \leq y \leq 1¼$, and only about 256 values for $\rho_Q$ over $|2f-1| \geq 1/2$. Perturbation of coefficients by one, at most, unit in the last place (ULP) each can also avoid worst cases.

Figure 4:
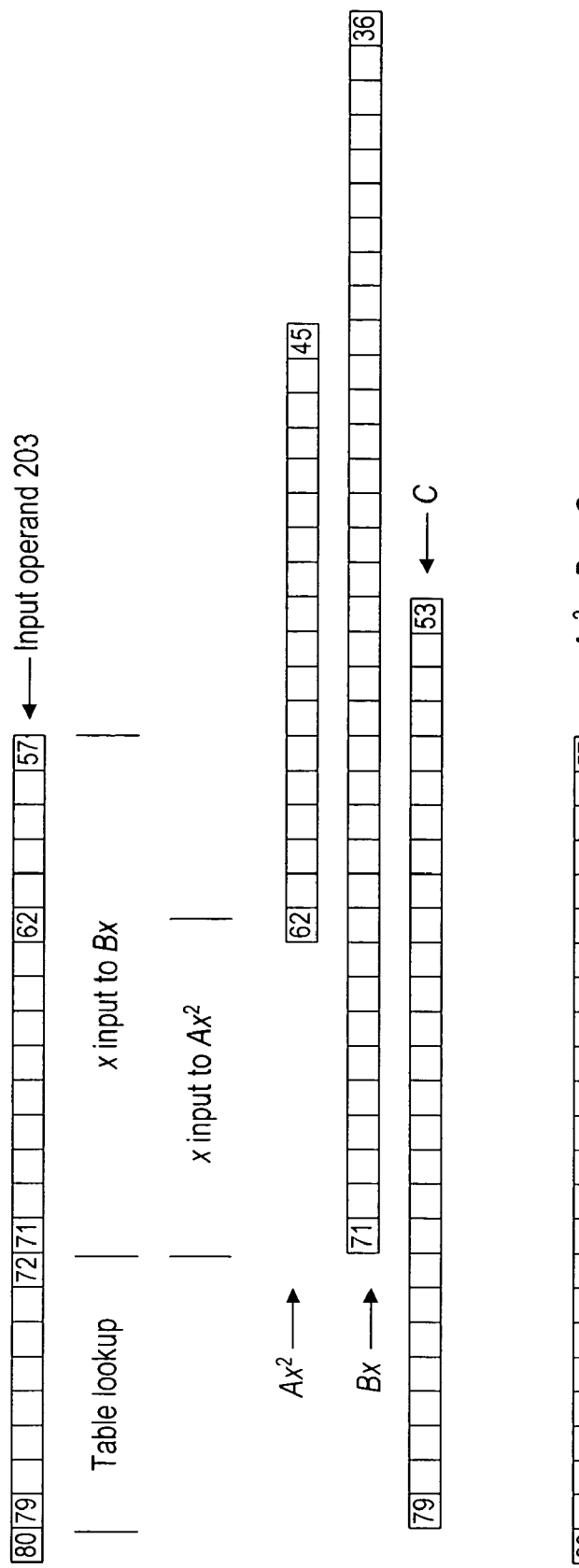
FIG. 4 illustrates a graph of the function $|2f-1^3 \cdot 2-27|$ and the odd and terminal term error term accumulation used in establishing table values for an embodiment of the present disclosure.

An advantage of the present disclosure for the use of floating point rounding to realize a monotonic operation to construct the coefficient tables shown in Appendix A is that the higher order (cubic) term approximation can be incorporated into the linear term such that no fourth coefficient term table is needed to realize a higher than quadratic level approximation. This concept is illustrated in FIG. 4, which illustrates a graph of the function $|2f-1|^3 2^{-27}$ and the odd and terminal term error term accumulation in which the present disclosure may be implemented. The functions graphed are sign symmetric about f=½.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

APPENDIX

A—COEFFICIENT TABLE FOR RECIPROCAL

```
// c2 DIV
width = 10
@000 3f9
@001 3f0
@002 3e4
@003 3d8
@004 3cc
@005 3c2
@006 3b5
@007 3aa
@008 3a0
@009 396
@00a 38c
@00b 381
@00c 378
@00d 36e
@00e 365
@00f 35c
@010 351
@011 348
@012 340
@013 336
@014 32c
@015 324
@016 31a
@017 311
@018 30c
@019 301
@01a 2fa
@01b 2f4
@01c 2e9
@01d 2e1
@01e 2da
@01f 2d4
@020 2cc
@021 2c4
@022 2bd
@023 2b5
@024 2b0
@025 2a8
@026 2a1
@027 29a
@028 294
@029 28c
@02a 288
@02b 280
@02c 27a
@02d 274
```

APPENDIX-continued

| | |
|---|---|
| @02e | 26c |
| @02f | 268 |
| @030 | 261 |
| @031 | 25c |
| @032 | 254 |
| @033 | 250 |
| @034 | 248 |
| @035 | 244 |
| @036 | 240 |
| @037 | 238 |
| @038 | 234 |
| @039 | 22d |
| @03a | 229 |
| @03b | 224 |
| @03c | 21d |
| @03d | 219 |
| @03e | 214 |
| @03f | 210 |
| @040 | 209 |
| @041 | 204 |
| @042 | 200 |
| @043 | 1fc |
| @044 | 1f8 |
| @045 | 1f1 |
| @046 | 1ed |
| @047 | 1e8 |
| @048 | 1e5 |
| @049 | 1e0 |
| @04a | 1dc |
| @04b | 1d8 |
| @04c | 1d2 |
| @04d | 1d0 |
| @04e | 1ca |
| @04f | 1c6 |
| @050 | 1c4 |
| @051 | 1c0 |
| @052 | 1ba |
| @053 | 1b8 |
| @054 | 1b4 |
| @055 | 1b1 |
| @056 | 1ac |
| @057 | 1a8 |
| @058 | 1a4 |
| @059 | 1a1 |
| @05a | 19d |
| @05b | 199 |
| @05c | 196 |
| @05d | 191 |
| @05e | 190 |
| @05f | 18d |
| @060 | 188 |
| @061 | 185 |
| @062 | 181 |
| @063 | 17d |
| @064 | 17c |
| @065 | 178 |
| @066 | 174 |
| @067 | 171 |
| @068 | 170 |
| @069 | 16c |
| @06a | 169 |
| @06b | 165 |
| @06c | 162 |
| @06d | 160 |
| @06e | 15d |
| @06f | 159 |
| @070 | 158 |
| @071 | 155 |
| @072 | 151 |
| @073 | 150 |
| @074 | 14c |
| @075 | 149 |
| @076 | 148 |
| @077 | 145 |
| @078 | 141 |
| @079 | 140 |
| @07a | 13c |
| @07b | 13a |
| @07c | 138 |

APPENDIX-continued

| | |
|---|---|
| @07d | 135 |
| @07e | 134 |
| @07f | 131 |
| @080 | 12e |
| @081 | 12c |
| @082 | 129 |
| @083 | 128 |
| @084 | 125 |
| @085 | 124 |
| @086 | 121 |
| @087 | 11d |
| @088 | 11c |
| @089 | 119 |
| @08a | 118 |
| @08b | 115 |
| @08c | 113 |
| @08d | 111 |
| @08e | 110 |
| @08f | 10d |
| @090 | 10c |
| @091 | 109 |
| @092 | 108 |
| @093 | 105 |
| @094 | 104 |
| @095 | 101 |
| @096 | 100 |
| @097 | fd |
| @098 | fc |
| @099 | fa |
| @09a | f8 |
| @09b | f8 |
| @09c | f5 |
| @09d | f4 |
| @09e | f1 |
| @09f | f0 |
| @0a0 | ed |
| @0a1 | ec |
| @0a2 | eb |
| @0a3 | e9 |
| @0a4 | e8 |
| @0a5 | e5 |
| @0a6 | e4 |
| @0a7 | e1 |
| @0a8 | e1 |
| @0a9 | e0 |
| @0aa | dd |
| @0ab | dc |
| @0ac | d9 |
| @0ad | d8 |
| @0ae | d8 |
| @0af | d5 |
| @0b0 | d5 |
| @0b1 | d4 |
| @0b2 | d1 |
| @0b3 | d1 |
| @0b4 | d0 |
| @0b5 | cd |
| @0b6 | cc |
| @0b7 | ca |
| @0b8 | c8 |
| @0b9 | c9 |
| @0ba | c6 |
| @0bb | c4 |
| @0bc | c4 |
| @0bd | c2 |
| @0be | c2 |
| @0bf | c0 |
| @0c0 | c0 |
| @0c1 | bd |
| @0c2 | bc |
| @0c3 | ba |
| @0c4 | b9 |
| @0c5 | b8 |
| @0c6 | b8 |
| @0c7 | b6 |
| @0c8 | b5 |
| @0c9 | b4 |
| @0ca | b1 |
| @0cb | b1 |

APPENDIX-continued

```
@0cc b0
@0cd b0
@0ce ad
@0cf ac
@0d0 ac
@0d1 a9
@0d2 a9
@0d3 a8
@0d4 a8
@0d5 a5
@0d6 a4
@0d7 a4
@0d8 a3
@0d9 a1
@0da a0
@0db a0
@0dc a0
@0dd 9d
@0de 9c
@0df 9c
@0e0 9b
@0e1 9a
@0e2 99
@0e3 99
@0e4 98
@0e5 95
@0e6 94
@0e7 94
@0e8 94
@0e9 91
@0ea 91
@0eb 91
@0ec 90
@0ed 90
@0ee 8e
@0ef 8d
@0f0 8c
@0f1 8c
@0f2 8c
@0f3 8a
@0f4 89
@0f5 88
@0f6 88
@0f7 85
@0f8 86
@0f9 85
@0fa 84
@0fb 84
@0fc 83
@0fd 81
@0fe 80
@0ff 81
```

B—COEFFICIENT TABLE FOR RECIPROCAL

```
// c1 DIV
width = 19
@000 7f807
@001 7e837
@002 7d895
@003 7c922
@004 7b9dc
@005 7aac3
@006 79bd6
@007 78d14
@008 77e7e
@009 77011
@00a 761ce
@00b 753b3
@00c 745c1
@00d 737f7
@00e 72a53
@00f 71cd6
@010 70f80
@011 7024e
@012 6f541
@013 6e859
@014 6db95
@015 6cef3
@016 6c275
```

APPENDIX-continued

```
@017 6b618
@018 6a9de
@019 69dc5
@01a 691cd
@01b 685f4
@01c 67a3c
@01d 66ea4
@01e 6632a
@01f 657cf
@020 64c93
@021 64174
@022 63672
@023 62b8d
@024 620c5
@025 61619
@026 60b89
@027 60114
@028 5f6ba
@029 5ec7b
@02a 5e256
@02b 5d84b
@02c 5ce5a
@02d 5c482
@02e 5bac3
@02f 5b11d
@030 5a78f
@031 59e19
@032 594bb
@033 58b74
@034 58244
@035 5792a
@036 57027
@037 5673b
@038 55e64
@039 555a4
@03a 54cf8
@03b 54461
@03c 53bdf
@03d 53372
@03e 52b19
@03f 522d4
@040 51aa3
@041 51285
@042 50a7b
@043 50284
@044 4fa9f
@045 4f2cd
@046 4eb0e
@047 4e360
@048 4dbc5
@049 4d43b
@04a 4ccc3
@04b 4c55c
@04c 4be06
@04d 4b6c1
@04e 4af8d
@04f 4a869
@050 4a155
@051 49a52
@052 4935e
@053 48c7a
@054 485a6
@055 47ee1
@056 4782b
@057 47184
@058 46aec
@059 46462
@05a 45de7
@05b 4577a
@05c 4511c
@05d 44acb
@05e 44489
@05f 43e53
@060 4382c
@061 43211
@062 42c04
@063 42604
@064 42011
@065 41a2b
```

APPENDIX-continued

@066 41451
@067 40e84
@068 408c3
@069 4030e
@06a 3fd65
@06b 3f7c9
@06c 3f238
@06d 3ecb3
@06e 3e739
@06f 3e1cb
@070 3dc68
@071 3d710
@072 3d1c4
@073 3cc82
@074 3c74b
@075 3c21f
@076 3bcfd
@077 3b7e6
@078 3b2d9
@079 3add7
@07a 3a8de
@07b 3a3f0
@07c 39f0c
@07d 39a31
@07e 39560
@07f 39099
@080 3abdb
@081 38727
@082 3827c
@083 37ddb
@084 37942
@085 374b3
@086 3702c
@087 36baf
@088 3673a
@089 362ce
@08a 35e6a
@08b 35a0f
@08c 355bd
@08d 35172
@08e 34d30
@08f 348f6
@090 344c5
@091 3409b
@092 33c79
@093 3385f
@094 3344d
@095 33043
@096 32c40
@097 32845
@098 32451
@099 32064
@09a 31c7f
@09b 318a1
@09c 314cb
@09d 310fb
@09e 30d33
@09f 30971
@0a0 305b7
@0a1 30203
@0a2 2fe56
@0a3 2fab0
@0a4 2f710
@0a5 2f378
@0a6 2efe5
@0a7 2ec59
@0a8 2e8d4
@0a9 2e554
@0aa 2e1db
@0ab 2de69
@0ac 2dafc
@0ad 2d796
@0ae 2d435
@0af 2d0db
@0b0 2cd87
@0b1 2ca38
@0b2 2c6f0
@0b3 2c3ad
@0b4 2c070

APPENDIX-continued

@0b5 2bd38
@0b6 2ba06
@0b7 2b6da
@0b8 2b3b3
@0b9 2b092
@0ba 2ad76
@0bb 2aa60
@0bc 2a74f
@0bd 2a443
@0be 2a13c
@0bf 29e3b
@0c0 29b3f
@0c1 29847
@0c2 29555
@0c3 29268
@0c4 28f80
@0c5 28c9d
@0c6 289bf
@0c7 286e5
@0c8 28410
@0c9 28140
@0ca 27e75
@0cb 27bae
@0cc 278ec
@0cd 2762f
@0ce 27376
@0cf 270c2
@0d0 26e12
@0d1 26b66
@0d2 268bf
@0d3 2661d
@0d4 2637e
@0d5 260e4
@0d6 25e4e
@0d7 25bbc
@0d8 2592f
@0d9 256a5
@0da 25420
@0db 2519f
@0dc 24f22
@0dd 24ca8
@0de 24a33
@0df 247c2
@0e0 24555
@0e1 242eb
@0e2 24086
@0e3 23e24
@0e4 23bc5
@0e5 2396b
@0e6 23715
@0e7 234c2
@0e8 23272
@0e9 23027
@0ea 22dde
@0eb 22b9a
@0ec 22959
@0ed 2271b
@0ee 224e1
@0ef 222ab
@0f0 22078
@0f1 21e48
@0f2 21c1b
@0f3 219f2
@0f4 217cc
@0f5 215aa
@0f6 2138b
@0f7 2116f
@0f8 20f56
@0f9 20d41
@0fa 20b2e
@0fb 2091f
@0fc 20713
@0fd 2050a
@0fe 20303
@0ff 20100

C—COEFFICIENT TABLE FOR RECIPROCAL

// c0 DIV
width = 28

APPENDIX-continued

```
@000 ffffc01
@001 ff00bfc
@002 fe03b98
@003 fd08a78
@004 fc0f83f
@005 fb18490
@006 fa22f15
@007 f92f773
@008 f83dd54
@009 f74e062
@00a f660049
@00b f573cb7
@00c f489559
@00d f3a09e1
@00e f2b99fb
@00f f1d455c
@010 f0f0bba
@011 f00ecc2
@012 ef2e82d
@013 ee4fdb4
@014 ed72d0b
@015 ec975e9
@016 ebbd80c
@017 eae532a
@018 ea0e6ff
@019 e93934c
@01a e8657ca
@01b e793436
@01c e6c2856
@01d e5f33e5
@01e e5256a4
@01f e459055
@020 e38e0bf
@021 e2c47a0
@022 e1fc4c0
@023 e1357e3
@024 e0700ce
@025 dfabf4b
@026 dee9320
@027 de27c15
@028 dd679f2
@029 dca8c85
@02a dbeb393
@02b db2eeed
@02c da73e5c
@02d d9ba1ad
@02e d9018af
@02f d84a32d
@030 d7940f9
@031 d6df1e0
@032 d62b5b5
@033 d578c44
@034 d4c7564
@035 d4170e0
@036 d367e8f
@037 d2b9e47
@038 d20cfd5
@039 d161313
@03a d0b67d0
@03b d00cde5
@03c cf64529
@03d cebcd6e
@03e ce1668f
@03f cd71061
@040 ccccabf
@041 cc2957e
@042 cb87078
@043 cae5b86
@044 ca45682
@045 c9a614a
@046 c907bb4
@047 c86a59c
@048 c7cdedf
@049 c732759
@04a c697ee6
@04b c5fe564
@04c c565ab1
@04d c4cdea7
@04e c43712a
```

APPENDIX-continued

```
@04f c3a1214
@050 c30c144
@051 c277e9e
@052 c1e49ff
@053 c152345
@054 c0c0a54
@055 c02ff0c
@056 bfa014f
@057 bf110fd
@058 be82df9
@059 bdf5824
@05a bd68f63
@05b bcdd398
@05c bc524a7
@05d bbc8273
@05e bb3ecdf
@05f bab63d0
@060 ba2e72e
@061 b9a76d9
@062 b9212ba
@063 b89bab5
@064 b816eae
@065 b792e8f
@066 b70fa3d
@067 b68d19e
@068 b60b498
@069 b58a315
@06a b509cfb
@06b b48a234
@06c b40b2a5
@06d b38ce37
@06e b30f4d4
@06f b292665
@070 b2162d0
@071 b19aa03
@072 b11fbe6
@073 b0a5860
@074 b02bf60
@075 afb30cd
@076 af3ac90
@077 aec3299
@078 ae4c2d0
@079 add5d1f
@07a ad60175
@07b aceafba
@07c ac767dc
@07d ac029c7
@07e ab8f566
@07f ab1caa8
@080 aaaa978
@081 aa391c3
@082 a9c8377
@083 a957e80
@084 a8e82cc
@085 a879049
@086 a80a6e5
@087 a79c690
@088 a72ef33
@089 a6c20c2
@08a a655b27
@08b a5e9e55
@08c a57ea39
@08d a513ec1
@08e a4a9bdd
@08f a44017f
@090 a3d6f94
@091 a36e60d
@092 a3064d8
@093 a29ebe8
@094 a237b2b
@095 a1d1293
@096 a16b20f
@097 a105992
@098 a0a090a
@099 a03c06a
@09a 9fd7fa3
@09b 9f746a5
@09c 9f11566
@09d 9eaebd1
```

APPENDIX-continued

@09e 9e4c9dd
@09f 9deaf78
@0a0 9d89c99
@0a1 9d2912c
@0a2 9cc8d27
@0a3 9c6907d
@0a4 9c09b1d
@0a5 9baad00
@0a6 9b4c612
@0a7 9aee64a
@0a8 9a90d99
@0a9 9a33bf2
@0aa 99d714c
@0ab 997ad97
@0ac 991f0c7
@0ad 98c3ad0
@0ae 9868ba4
@0af 980e33c
@0b0 97b4186
@0b1 975a679
@0b2 970120b
@0b3 96a842c
@0b4 964fcd3
@0b5 95f7bf6
@0b6 95a0186
@0b7 9548d7b
@0b8 94f1fc8
@0b9 949b861
@0ba 944573f
@0bb 93efc54
@0bc 939a794
@0bd 93458f8
@0be 92f1072
@0bf 929cdfb
@0c0 9249186
@0c1 91f5b0a
@0c2 91a2a7c
@0c3 914ffd3
@0c4 90fdb03
@0c5 90abc04
@0c6 905a2cb
@0c7 9008f4f
@0c8 8fb8186
@0c9 8f67966
@0ca 8f176e8
@0cb 8ec79fe
@0cc 8e782a2
@0cd 8e290ca
@0ce 8dda46f
@0cf 8d8bd84
@0d0 8d3dc01
@0d1 8ceffdf
@0d2 8ca2913
@0d3 8c55796
@0d4 8c08b5d
@0d5 8bbc463
@0d6 8b7029c
@0d7 8b24600
@0d8 8ad8e89
@0d9 8a8dc2c
@0da 8a42ee2
@0db 89f86a2
@0dc 89ae365
@0dd 8964523
@0de 891abd3
@0df 88d176d
@0e0 88887ea
@0e1 883fd41
@0e2 87f776c
@0e3 87af661
@0e4 8767a19
@0e5 8720291
@0e6 86d8fbc
@0e7 8692193
@0e8 864c810
@0e9 860532e
@0ea 85bf2e0
@0eb 8579724
@0ec 8533ff1

APPENDIX-continued

@0ed 84eed3f
@0ee 84a9f0a
@0ef 8465549
@0f0 8420ff4
@0f1 83dcf05
@0f2 8399275
@0f3 8355a40
@0f4 831265c
@0f5 82cf6c4
@0f6 828cb70
@0f7 824a45c
@0f8 820817e
@0f9 81c62d3
@0fa 8184852
@0fb 81431f6
@0fc 8101fba
@0fd 80c1196
@0fe 8080783
@0ff 804017c

A—COEFFICIENTS FOR ODD SQUARE ROOT RECIPROCAL

// c2 SQRT
odd width = 9
@000 17d
@001 179
@002 178
@003 174
@004 170
@005 16d
@006 168
@007 164
@008 162
@009 160
@00a 15c
@00b 158
@00c 155
@00d 151
@00e 150
@00f 14c
@010 148
@011 146
@012 142
@013 140
@014 13c
@015 139
@016 138
@017 135
@018 132
@019 130
@01a 12c
@01b 12a
@01c 128
@01d 124
@01e 122
@01f 120
@020 11d
@021 11c
@022 118
@023 116
@024 114
@025 111
@026 110
@027 10d
@028 109
@029 108
@02a 105
@02b 104
@02c 102
@02d 100
@02e fd
@02f fc
@030 f9
@031 f8
@032 f5
@033 f4
@034 f0
@035 f0
@036 ed
@037 ec APPENDIX-continued

| | |
|---|---|
| @038 | e9 |
| @039 | e8 |
| @03a | e5 |
| @03b | e5 |
| @03c | e1 |
| @03d | e0 |
| @03e | de |
| @03f | dd |
| @040 | da |
| @041 | d8 |
| @042 | d8 |
| @043 | d5 |
| @044 | d4 |
| @045 | d2 |
| @046 | d1 |
| @047 | d0 |
| @048 | cd |
| @049 | cc |
| @04a | cc |
| @04b | c9 |
| @04c | c8 |
| @04d | c6 |
| @04e | c6 |
| @04f | c4 |
| @050 | c2 |
| @051 | c1 |
| @052 | c0 |
| @053 | bd |
| @054 | bc |
| @055 | b9 |
| @056 | b9 |
| @057 | b8 |
| @058 | b8 |
| @059 | b5 |
| @05a | b4 |
| @05b | b4 |
| @05c | b1 |
| @05d | b0 |
| @05e | b0 |
| @05f | ad |
| @060 | ac |
| @061 | ac |
| @062 | aa |
| @063 | a8 |
| @064 | a8 |
| @065 | a8 |
| @066 | a4 |
| @067 | a4 |
| @068 | a2 |
| @069 | a2 |
| @06a | a1 |
| @06b | a0 |
| @06c | a0 |
| @06d | a0 |
| @06e | 9c |
| @06f | 9c |
| @070 | 9a |
| @071 | 99 |
| @072 | 98 |
| @073 | 98 |
| @074 | 96 |
| @075 | 95 |
| @076 | 95 |
| @077 | 94 |
| @078 | 92 |
| @079 | 91 |
| @07a | 91 |
| @07b | 90 |
| @07c | 90 |
| @07d | 8d |
| @07e | 8c |
| @07f | 8c |
| @080 | 8b |
| @081 | 89 |
| @082 | 89 |
| @083 | 88 |
| @084 | 88 |
| @085 | 88 |
| @086 | 86 |

APPENDIX-continued

| | |
|---|---|
| @087 | 85 |
| @088 | 84 |
| @089 | 84 |
| @08a | 82 |
| @08b | 81 |
| @08c | 80 |
| @08d | 80 |
| @08e | 80 |
| @08f | 7d |
| @090 | 7d |
| @091 | 7c |
| @092 | 7c |
| @093 | 7c |
| @094 | 7a |
| @095 | 79 |
| @096 | 78 |
| @097 | 78 |
| @098 | 78 |
| @099 | 76 |
| @09a | 75 |
| @09b | 75 |
| @09c | 75 |
| @09d | 74 |
| @09e | 74 |
| @09f | 72 |
| @0a0 | 72 |
| @0a1 | 71 |
| @0a2 | 70 |
| @0a3 | 70 |
| @0a4 | 70 |
| @0a5 | 70 |
| @0a6 | 6d |
| @0a7 | 6c |
| @0a8 | 6c |
| @0a9 | 6c |
| @0aa | 6c |
| @0ab | 6b |
| @0ac | 69 |
| @0ad | 69 |
| @0ae | 69 |
| @0af | 69 |
| @0b0 | 68 |
| @0b1 | 68 |
| @0b2 | 65 |
| @0b3 | 65 |
| @0b4 | 64 |
| @0b5 | 64 |
| @0b5 | 64 |
| @0b7 | 64 |
| @0b8 | 63 |
| @0b9 | 61 |
| @0ba | 62 |
| @0bb | 61 |
| @0bc | 61 |
| @0bd | 60 |
| @0be | 60 |
| @0bf | 60 |
| @0c0 | 5e |
| @0c1 | 5d |
| @0c2 | 5e |
| @0c3 | 5d |
| @0c4 | 5c |
| @0c5 | 5c |
| @0c6 | 5c |
| @0c7 | 5c |
| @0c8 | 59 |
| @0c9 | 5a |
| @0ca | 5a |
| @0cb | 59 |
| @0cc | 58 |
| @0cd | 58 |
| @0ce | 58 |
| @0cf | 58 |
| @0d0 | 56 |
| @0d1 | 55 |
| @0d2 | 55 |
| @0d3 | 55 |
| @0d4 | 54 |
| @0d5 | 54 |

APPENDIX-continued

@0d5 54
@0d7 54
@0d8 52
@0d9 52
@0da 52
@0db 52
@0dc 51
@0dd 50
@0de 50
@0df 50
@0e0 50
@0e1 50
@0e2 4e
@0e3 50
@0e4 4d
@0e5 4e
@0e6 4c
@0e7 4d
@0e8 4c
@0e9 4c
@0ea 4c
@0eb 4c
@0ec 4b
@0ed 4a
@0ee 4a
@0ef 49
@0f0 49
@0f1 49
@0f2 48
@0f3 48
@0f4 48
@0f5 48
@0f6 48
@0f7 48
@0f8 48
@0f9 46
@0fa 46
@0fb 44
@0fc 45
@0fd 44
@0fe 45
@0ff 44

A—COEFFICIENTS FOR EVEN SQUARE ROOT RECIPROCAL

// c2 SQRT
even
@100 110
@101 10c
@102 108
@103 108
@104 104
@105 101
@106 100
@107 fd
@108 fa
@109 f8
@10a f5
@10b f4
@10c f1
@10d f0
@10e ec
@10f ea
@110 e9
@111 e6
@112 e4
@113 e1
@114 e0
@115 dd
@116 dc
@117 da
@118 d8
@119 d5
@11a d4
@11b d1
@11c d1
@11d d0
@11e cd
@11f cc
@120 c9

APPENDIX-continued

@121 c8
@122 c6
@123 c5
@124 c4
@125 c0
@126 c0
@127 be
@128 bc
@129 ba
@12a b8
@12b b8
@12c b5
@12d b5
@12e b2
@12f b1
@130 b1
@131 b0
@132 ac
@133 ac
@134 aa
@135 a8
@136 a8
@137 a5
@138 a5
@139 a4
@13a a2
@13b a0
@13c a0
@13d a0
@13e 9d
@13f 9c
@140 9c
@141 99
@142 98
@143 98
@144 96
@145 95
@146 94
@147 94
@148 92
@149 90
@14a 90
@14b 90
@14c 8d
@14d 8c
@14e 8a
@14f 89
@150 88
@151 88
@152 88
@153 88
@154 84
@155 84
@156 84
@157 82
@158 82
@159 80
@15a 80
@15b 7e
@15c 7d
@15d 7c
@15e 7c
@15f 7c
@160 79
@161 79
@162 79
@163 78
@164 78
@165 75
@166 75
@167 74
@168 74
@169 72
@16a 72
@16b 71
@16c 70
@16d 70
@16e 70
@16f 6d

APPENDIX-continued

| | |
|---|---|
| @170 | 6d |
| @171 | 6c |
| @172 | 6c |
| @173 | 6a |
| @174 | 6a |
| @175 | 69 |
| @176 | 68 |
| @177 | 69 |
| @178 | 68 |
| @179 | 68 |
| @17a | 66 |
| @17b | 66 |
| @17c | 65 |
| @17d | 64 |
| @17e | 64 |
| @17f | 64 |
| @180 | 62 |
| @181 | 61 |
| @182 | 60 |
| @183 | 61 |
| @184 | 60 |
| @185 | 60 |
| @186 | 60 |
| @187 | 60 |
| @188 | 5c |
| @189 | 5c |
| @18a | 5c |
| @18b | 5c |
| @18c | 5c |
| @18d | 59 |
| @18e | 59 |
| @18f | 58 |
| @190 | 58 |
| @191 | 58 |
| @192 | 58 |
| @193 | 58 |
| @194 | 58 |
| @195 | 56 |
| @196 | 55 |
| @197 | 54 |
| @198 | 54 |
| @199 | 54 |
| @19a | 54 |
| @19b | 52 |
| @19c | 52 |
| @19d | 51 |
| @19e | 51 |
| @19f | 50 |
| @1a0 | 50 |
| @1a1 | 50 |
| @1a2 | 50 |
| @1a3 | 50 |
| @1a4 | 4e |
| @1a5 | 4d |
| @1a6 | 4d |
| @1a7 | 4d |
| @1a8 | 4d |
| @1a9 | 4c |
| @1aa | 4c |
| @1ab | 4c |
| @1ac | 4b |
| @1ad | 49 |
| @1ae | 4a |
| @1af | 49 |
| @1b0 | 49 |
| @1b1 | 48 |
| @1b2 | 49 |
| @1b3 | 48 |
| @1b4 | 48 |
| @1b5 | 48 |
| @1b6 | 48 |
| @1b7 | 45 |
| @1b8 | 46 |
| @1b9 | 45 |
| @1ba | 45 |
| @1bb | 45 |
| @1bc | 44 |
| @1bd | 44 |
| @1be | 44 |

APPENDIX-continued

| | |
|---|---|
| @1bf | 44 |
| @1c0 | 44 |
| @1c1 | 41 |
| @1c2 | 41 |
| @1c3 | 42 |
| @1c4 | 41 |
| @1c5 | 40 |
| @1c6 | 40 |
| @1c7 | 40 |
| @1c8 | 40 |
| @1c9 | 40 |
| @1ca | 40 |
| @1cb | 40 |
| @1cc | 40 |
| @1cd | 3e |
| @1ce | 3e |
| @1cf | 3e |
| @1d0 | 3d |
| @1d1 | 3c |
| @1d2 | 3c |
| @1d3 | 3c |
| @1d4 | 3d |
| @1d5 | 3c |
| @1d6 | 3c |
| @1d7 | 3c |
| @1d8 | 3a |
| @1d9 | 3a |
| @1da | 39 |
| @1db | 3a |
| @1dc | 39 |
| @1dd | 39 |
| @1de | 39 |
| @1df | 39 |
| @1e0 | 38 |
| @1e1 | 38 |
| @1e2 | 38 |
| @1e3 | 38 |
| @1e4 | 38 |
| @1e5 | 38 |
| @1e6 | 38 |
| @1e7 | 36 |
| @1e8 | 35 |
| @1e9 | 36 |
| @1ea | 34 |
| @1eb | 35 |
| @1ec | 35 |
| @1ed | 35 |
| @1ee | 35 |
| @1ef | 34 |
| @1f0 | 34 |
| @1f1 | 34 |
| @1f2 | 34 |
| @1f3 | 34 |
| @1f4 | 34 |
| @1f5 | 31 |
| @1f6 | 31 |
| @1f7 | 32 |
| @1f8 | 31 |
| @1f9 | 31 |
| @1fa | 32 |
| @1fb | 31 |
| @1fc | 31 |
| @1fd | 30 |
| @1fe | 30 |
| @1ff | 30 |

B—COEFFICIENTS FOR ODD SQUARE ROOT RECIPROCAL

```
// c1 SQRT
odd width = 18
@000 3fd02
@001 3f711
@002 3f12f
@003 3eb5b
@004 3e595
@005 3dfde
@006 3da34
@007 3d498
@008 3cf0a
@009 3c989
```

APPENDIX-continued

| | |
|---|---|
| @00a | 3c416 |
| @00b | 3beaf |
| @00c | 3b955 |
| @00d | 3b408 |
| @00e | 3aec7 |
| @00f | 3a993 |
| @010 | 3a46b |
| @011 | 39f4f |
| @012 | 39a3f |
| @013 | 3953b |
| @014 | 39042 |
| @015 | 38b55 |
| @016 | 38673 |
| @017 | 3819c |
| @018 | 37cd1 |
| @019 | 37810 |
| @01a | 3735a |
| @01b | 36eae |
| @01c | 36a0d |
| @01d | 36576 |
| @01e | 360ea |
| @01f | 35c68 |
| @020 | 357f0 |
| @021 | 35381 |
| @022 | 34f1d |
| @023 | 34ac2 |
| @024 | 34670 |
| @025 | 34229 |
| @026 | 33dea |
| @027 | 339b4 |
| @028 | 33588 |
| @029 | 33164 |
| @02a | 32d4a |
| @02b | 32938 |
| @02c | 3252e |
| @02d | 3212e |
| @02e | 31d36 |
| @02f | 31946 |
| @030 | 3155e |
| @031 | 3117e |
| @032 | 30da7 |
| @033 | 309d8 |
| @034 | 30611 |
| @035 | 30251 |
| @036 | 2fe99 |
| @037 | 2fae9 |
| @038 | 2f740 |
| @039 | 2f39f |
| @03a | 2f005 |
| @03b | 2ec73 |
| @03c | 2e8e7 |
| @03d | 2e563 |
| @03e | 2e1e6 |
| @03f | 2de70 |
| @040 | 2db00 |
| @041 | 2d798 |
| @042 | 2d436 |
| @043 | 2d0db |
| @044 | 2cd87 |
| @045 | 2ca39 |
| @046 | 2c6f2 |
| @047 | 2c3b1 |
| @048 | 2c076 |
| @049 | 2bd42 |
| @04a | 2ba14 |
| @04b | 2b6ec |
| @04c | 2b3ca |
| @04d | 2b0ae |
| @04e | 2ad98 |
| @04f | 2aa88 |
| @050 | 2a77d |
| @051 | 2a479 |
| @052 | 2a17a |
| @053 | 29e81 |
| @054 | 29b8d |
| @055 | 2989f |
| @056 | 295b6 |
| @057 | 292d3 |
| @058 | 28ff5 |
| @059 | 28d1d |
| @05a | 28a4a |
| @05b | 2877c |
| @05c | 284b3 |
| @05d | 281ef |
| @05e | 27f30 |
| @05f | 27c76 |
| @060 | 279c1 |
| @061 | 27712 |
| @062 | 27466 |
| @063 | 271c0 |
| @064 | 26f1e |
| @065 | 26c82 |
| @066 | 269e9 |
| @067 | 26756 |
| @068 | 264c7 |
| @069 | 2623c |
| @06a | 25fb6 |
| @06b | 25d35 |
| @06c | 25ab8 |
| @06d | 2583f |
| @06e | 255cb |
| @06f | 2535a |
| @070 | 250ee |
| @071 | 24e86 |
| @072 | 24c23 |
| @073 | 249c3 |
| @074 | 24768 |
| @075 | 24510 |
| @076 | 242bd |
| @077 | 2406e |
| @078 | 23e22 |
| @079 | 23bdb |
| @07a | 23997 |
| @07b | 23757 |
| @07c | 2351a |
| @07d | 232e2 |
| @07e | 230ad |
| @07f | 22e7c |
| @080 | 22c4f |
| @081 | 22a25 |
| @082 | 227ff |
| @083 | 225dc |
| @084 | 223bd |
| @085 | 221a2 |
| @086 | 21f89 |
| @087 | 21d74 |
| @088 | 21b63 |
| @089 | 21955 |
| @08a | 2174a |
| @08b | 21543 |
| @08c | 2133f |
| @08d | 2113e |
| @08e | 20f40 |
| @08f | 20d46 |
| @090 | 20b4e |
| @091 | 2095a |
| @092 | 20769 |
| @093 | 2057b |
| @094 | 20390 |
| @095 | 201a8 |
| @096 | 1ffc3 |
| @097 | 1fde2 |
| @098 | 1fc02 |
| @099 | 1fa26 |
| @09a | 1f84d |
| @09b | 1f677 |
| @09c | 1f4a3 |
| @09d | 1f2d3 |
| @09e | 1f105 |
| @09f | 1ef3a |
| @0a0 | 1ed71 |
| @0a1 | 1ebac |
| @0a2 | 1e9e9 |
| @0a3 | 1e829 |
| @0a4 | 1e66b |
| @0a5 | 1e4b1 |
| @0a6 | 1e2f8 |
| @0a7 | 1e143 |

APPENDIX-continued

```
@0a8 1df90
@0a9 1dddf
@0aa 1dc31
@0ab 1da86
@0ac 1d8dd
@0ad 1d736
@0ae 1d592
@0af 1d3f0
@0b0 1d251
@0b1 1d0b4
@0b2 1cf1a
@0b3 1cd82
@0b4 1cbec
@0b5 1ca58
@0b6 1c8c7
@0b7 1c738
@0b8 1c5ac
@0b9 1c422
@0ba 1c299
@0bb 1c113
@0bc 1bf90
@0bd 1be0e
@0be 1bc8f
@0bf 1bb11
@0c0 1b996
@0c1 1b81d
@0c2 1b6a6
@0c3 1b531
@0c4 1b3bf
@0c5 1b24e
@0c6 1b0df
@0c7 1af72
@0c8 1ae08
@0c9 1ac9f
@0ca 1ab38
@0cb 1a9d3
@0cc 1a870
@0cd 1a710
@0ce 1a5b0
@0cf 1a453
@0d0 1a2f8
@0d1 1a19f
@0d2 1a047
@0d3 19ef1
@0d4 19d9d
@0d5 19c4b
@0d6 19afb
@0d7 199ac
@0d8 1985f
@0d9 19714
@0da 195cb
@0db 19484
@0dc 1933e
@0dd 191fa
@0de 190b7
@0df 18f77
@0e0 18e38
@0e1 18cfa
@0e2 18bbe
@0e3 18a84
@0e4 1894c
@0e5 18815
@0e6 186df
@0e7 185ac
@0e8 1847a
@0e9 18349
@0ea 1821a
@0eb 180ec
@0ec 17fc0
@0ed 17e96
@0ee 17d6d
@0ef 17c46
@0f0 17b20
@0f1 179fb
@0f2 178d8
@0f3 177b7
@0f4 17696
@0f5 17578
@0f6 1745b
@0f7 1733f
```

APPENDIX-continued

```
@0f8 17224
@0f9 1710b
@0fa 16ff4
@0fb 16edd
@0fc 16dc8
@0fd 16cb5
@0fe 16ba3
@0ff 16a92
```

B—COEFFICENTS FOR EVEN SQUARE ROOT RECIPROCAL

```
// c1 SQRT even
@100 2d1f6
@101 2cdc3
@102 2c99a
@103 2c57b
@104 2c166
@105 2bd5b
@106 2b95a
@107 2b563
@108 2b175
@109 2ad91
@10a 2a9b6
@10b 2a5e4
@10c 2a21c
@10d 29e5c
@10e 29aa5
@10f 296f7
@110 29352
@111 28fb5
@112 28c21
@113 28894
@114 28510
@115 28195
@116 27e21
@117 27ab5
@118 27751
@119 273f4
@11a 2709f
@11b 26d52
@11c 26a0c
@11d 266cd
@11e 26396
@11f 26066
@120 25d3d
@121 25a1b
@122 25700
@123 253eb
@124 250de
@125 24dd7
@126 24ad6
@127 247dc
@128 244e9
@129 241fc
@12a 23f15
@12b 23c34
@12c 23959
@12d 23685
@12e 233b6
@12f 230ee
@130 22e2b
@131 22b6e
@132 228b6
@133 22605
@134 22359
@135 220b2
@136 21e11
@137 21b75
@138 218df
@139 2164e
@13a 213c2
@13b 2113b
@13c 20eba
@13d 20c3d
@13e 209c6
@13f 20753
@140 204e5
@141 2027c
@142 20018
@143 1fdb9
```

APPENDIX-continued

| | |
|---|---|
| @144 | 1fb5e |
| @145 | 1f908 |
| @146 | 1f6b7 |
| @147 | 1f46a |
| @148 | 1f221 |
| @149 | 1efdd |
| @14a | 1ed9d |
| @14b | 1eb62 |
| @14c | 1e92b |
| @14d | 1e6f8 |
| @14e | 1e4c9 |
| @14f | 1e29f |
| @150 | 1e079 |
| @151 | 1de56 |
| @152 | 1dc38 |
| @153 | 1da1e |
| @154 | 1d808 |
| @155 | 1d5f5 |
| @156 | 1d3e7 |
| @157 | 1d1dc |
| @158 | 1cfd5 |
| @159 | 1cdd2 |
| @15a | 1cbd3 |
| @15b | 1c9d7 |
| @15c | 1c7df |
| @15d | 1c5ea |
| @15e | 1c3f9 |
| @15f | 1c20c |
| @160 | 1c022 |
| @161 | 1be3b |
| @162 | 1bc59 |
| @163 | 1ba79 |
| @164 | 1b89c |
| @165 | 1b6c4 |
| @166 | 1b4ee |
| @167 | 1b31c |
| @168 | 1b14c |
| @169 | 1af80 |
| @16a | 1adb8 |
| @16b | 1abf2 |
| @16c | 1aa30 |
| @16d | 1a870 |
| @16e | 1a6b4 |
| @16f | 1a4fa |
| @170 | 1a344 |
| @171 | 1a191 |
| @172 | 19fe0 |
| @173 | 19e32 |
| @174 | 19c88 |
| @175 | 19ae0 |
| @176 | 1993b |
| @177 | 19799 |
| @178 | 195f9 |
| @179 | 1945d |
| @17a | 192c2 |
| @17b | 1912b |
| @17c | 18f97 |
| @17d | 18e05 |
| @17e | 18c75 |
| @17f | 18ae9 |
| @180 | 1895f |
| @181 | 187d7 |
| @182 | 18652 |
| @183 | 184cf |
| @184 | 1834f |
| @185 | 181d2 |
| @186 | 18057 |
| @187 | 17ede |
| @188 | 17d68 |
| @189 | 17bf4 |
| @18a | 17a82 |
| @18b | 17913 |
| @18c | 177a6 |
| @18d | 1763b |
| @18e | 174d3 |
| @18f | 1736c |
| @190 | 17209 |
| @191 | 170a7 |
| @192 | 16f47 |

APPENDIX-continued

| | |
|---|---|
| @193 | 16dea |
| @194 | 16c8f |
| @195 | 16b36 |
| @196 | 169df |
| @197 | 1688a |
| @198 | 16737 |
| @199 | 165e7 |
| @19a | 16498 |
| @19b | 1634c |
| @19c | 16201 |
| @19d | 160b9 |
| @19e | 15f72 |
| @19f | 15e2e |
| @1a0 | 15ceb |
| @1a1 | 15baa |
| @1a2 | 15a6b |
| @1a3 | 1592e |
| @1a4 | 157f3 |
| @1a5 | 156ba |
| @1a6 | 15583 |
| @1a7 | 1544d |
| @1a8 | 1531a |
| @1a9 | 151e8 |
| @1aa | 150b8 |
| @1ab | 14f8a |
| @1ac | 14e5d |
| @1ad | 14d32 |
| @1ae | 14c09 |
| @1af | 14ae2 |
| @1b0 | 149bc |
| @1b1 | 14898 |
| @1b2 | 14776 |
| @1b3 | 14656 |
| @1b4 | 14537 |
| @1b5 | 14419 |
| @1b6 | 142fe |
| @1b7 | 141e4 |
| @1b8 | 140cb |
| @1b9 | 13fb4 |
| @1ba | 13e9f |
| @1bb | 13d8b |
| @1bc | 13c79 |
| @1bd | 13b69 |
| @1be | 13a5a |
| @1bf | 1394c |
| @1c0 | 13840 |
| @1c1 | 13735 |
| @1c2 | 1362c |
| @1c3 | 13524 |
| @1c4 | 1341e |
| @1c5 | 13319 |
| @1c6 | 13216 |
| @1c7 | 13114 |
| @1c8 | 13014 |
| @1c9 | 12f15 |
| @1ca | 12e17 |
| @1cb | 12d1b |
| @1cc | 12c20 |
| @1cd | 12b26 |
| @1ce | 12a2e |
| @1cf | 12937 |
| @1d0 | 12841 |
| @1d1 | 1274d |
| @1d2 | 1265a |
| @1d3 | 12569 |
| @1d4 | 12478 |
| @1d5 | 12389 |
| @1d6 | 1229b |
| @1d7 | 121af |
| @1d8 | 120c4 |
| @1d9 | 11fd9 |
| @1da | 11ef0 |
| @1db | 11e09 |
| @1dc | 11d22 |
| @1dd | 11c3d |
| @1de | 11b59 |
| @1df | 11a77 |
| @1e0 | 11995 |
| @1e1 | 118b5 |

APPENDIX-continued

```
            @1e2 117d5
            @1e3 116f7
            @1e4 1161a
            @1e5 1153e
            @1e6 11463
            @1e7 1138a
            @1e8 112b1
            @1e9 111da
            @1ea 11104
            @1eb 1102f
            @1ec 10f5b
            @1ed 10e87
            @1ee 10db6
            @1ef 10ce5
            @1f0 10c15
            @1f1 10b46
            @1f2 10a78
            @1f3 109ab
            @1f4 108e0
            @1f5 10815
            @1f6 1074b
            @1f7 10683
            @1f8 105bb
            @1f9 104f4
            @1fa 1042e
            @1fb 1036a
            @1fc 102a6
            @1fd 101e3
            @1fe 10121
            @1ff 10060
C—COEFFICIENTS FOR ODD SQUARE ROOT RECIPROCAL

// c0 SQRT odd
            width = 28
            @000 ffffe7e
            @001 ff8047d
            @002 ff0165d
            @003 fe83403
            @004 fe05d50
            @005 fd89229
            @006 fd0d271
            @007 fc91e0c
            @008 fc174de
            @009 fb9d6cc
            @00a fb243be
            @00b faabb96
            @00c fa33e3b
            @00d f9bcb94
            @00e f946386
            @00f f8d05fb
            @010 f85b2d8
            @011 f7e6a04
            @012 f772b69
            @013 f6ff6ed
            @014 f68cc7a
            @015 f61abf9
            @016 f5a9550
            @017 f53886d
            @018 f4c8538
            @019 f458b99
            @01a f3e9b7d
            @01b f37b4cb
            @01c f30d770
            @01d f2a0359
            @01e f23386e
            @01f f1c769b
            @020 f15bdce
            @021 f0f0def
            @022 f0866f0
            @023 f01c8b8
            @024 efb3335
            @025 ef4a658
            @026 eee2208
            @027 ee7a637
            @028 ee132d2
            @029 edac7c3
            @02a ed464fe
            @02b ece0a6c
            @02c ec7b7fe
```

APPENDIX-continued

```
            @02d ec16da4
            @02e ebb2b4b
            @02f eb4f0e1
            @030 eaebe57
            @031 ea8939b
            @032 ea270a1
            @033 e9c5553
            @034 e9641a6
            @035 e903585
            @036 e8a30e5
            @037 e8433b4
            @038 e7e3de4
            @039 e784f65
            @03a e726829
            @03b e6c8820
            @03c e66af3d
            @03d e60dd70
            @03e e5b12ac
            @03f e554ee2
            @040 e4f9204
            @041 e49dc05
            @042 e442cd5
            @043 e3e846b
            @044 e38e2b6
            @045 e3347aa
            @046 e2db339
            @047 e282556
            @048 e229df7
            @049 e1d1d0c
            @04a e17a289
            @04b e122e64
            @04c e0cc08e
            @04d e0758fc
            @04e e01f7a1
            @04f dfc9c73
            @050 df74765
            @051 df1f86c
            @052 decaf7b
            @053 de76c8a
            @054 de22f89
            @055 ddcf871
            @056 dd7c733
            @057 dd29bc7
            @058 dcd7621
            @059 dc85639
            @05a dc33c00
            @05b dbe276e
            @05c db91879
            @05d db40f14
            @05e daf0b37
            @05f daa0cd9
            @060 da513ed
            @061 da0206c
            @062 d9b324a
            @063 d96497f
            @064 d9165ff
            @065 d8c87c3
            @066 d87aec2
            @067 d82daf0
            @068 d7e0c46
            @069 d7942b8
            @06a d747e40
            @06b d6fbed4
            @06c d6b046b
            @06d d664efc
            @06e d619e81
            @06f d5cf2ec
            @070 d584c39
            @071 d53aa5d
            @072 d4f0d51
            @073 d4a750b
            @074 d45e187
            @075 d4152b7
            @076 d3cc897
            @077 d38431e
            @078 d33c244
            @079 d2f4601
            @07a d2ace4c
            @07b d265b1f
```

APPENDIX-continued

```
@07c d21ec71
@07d d1d823f
@07e d191c7b
@07f d14bb20
@080 d105e29
@081 d0c058c
@082 d07b142
@083 d036145
@084 cff158c
@085 cface13
@086 cf68ad1
@087 cf24bbf
@088 cee10d7
@089 ce9da11
@08a ce5a768
@08b ce178d4
@08c cdd4e4f
@08d cd927d1
@08e cd50555
@08f cd0e6d7
@090 ccccc4b
@091 cc8b5af
@092 cc4a2fa
@093 cc09428
@094 cbc8933
@095 cb88213
@096 cb47ec3
@097 cb07f3d
@098 cac8379
@099 ca88b76
@09a ca4972a
@09b ca0a690
@09c c9cb9a2
@09d c98d05c
@09e c94eab7
@09f c9108ae
@0a0 c8d2a3a
@0a1 c894f58
@0a2 c857801
@0a3 c81a42f
@0a4 c7dd3dd
@0a5 c7a0707
@0a6 c763da7
@0a7 c7277b8
@0a8 c6eb533
@0a9 c6af613
@0aa c673a56
@0ab c6381f5
@0ac c5fcceb
@0ad c5c1b32
@0ae c586cc6
@0af c54c1a2
@0b0 c5119c2
@0b1 c4d7520
@0b2 c49d3ba
@0b3 c463587
@0b4 c429a84
@0b5 c3f02ac
@0b6 c3b6dfb
@0b7 c37dc6c
@0b8 c344dfd
@0b9 c30c2a7
@0ba c2d3a63
@0bb c29b531
@0bc c26330b
@0bd c22b3ec
@0be c1f37d0
@0bf c1bbeb2
@0c0 c184891
@0c1 c14d565
@0c2 c11652a
@0c3 c0df7de
@0c4 c0a8d7c
@0c5 c0725ff
@0c6 c03c163
@0c7 c005fa4
@0c8 bfd00c2
@0c9 bf9a4b2
@0ca bf64b74
```

APPENDIX-continued

```
@0cb bf2f504
@0cc befa15e
@0cd bec507e
@0ce be9025e
@0cf be5b6fe
@0d0 be26e59
@0d1 bdf286a
@0d2 bdbe52d
@0d3 bd8a49f
@0d4 bd566bd
@0d5 bd22b82
@0d6 bcef2ec
@0d7 bcbbcf6
@0d8 bc8899f
@0d9 bc558e0
@0da bc22ab7
@0db bbeff21
@0dc bbbd61a
@0dd bb8af9f
@0de bb58bab
@0df bb26a3d
@0e0 baf4b50
@0e1 bac2ee0
@0e2 ba914ed
@0e3 ba5fd6f
@0e4 ba2e869
@0e5 b9fd5d1
@0e6 b9cc5a8
@0e7 b99b7e9
@0e8 b96ac92
@0e9 b93a39f
@0ea b909d0d
@0eb b8d98d8
@0ec b8a9700
@0ed b879780
@0ee b849a54
@0ef b819f7b
@0f0 b7ea6f0
@0f1 b7bb0b0
@0f2 b78bcba
@0f3 b75cb0a
@0f4 b72db9c
@0f5 b6fee70
@0f6 b6d0380
@0f7 b6a1acb
@0f8 b67344d
@0f9 b645006
@0fa b616df0
@0fb b5e8e09
@0fc b5bb04e
@0fd b58d4be
@0fe b55fb54
@0ff b53240f
```

C—COEFFICENTS FOR EVEN SQUARE ROOT RECIPROCAL

```
// c0 SQRT
even
@100 b504e1f
@101 b4aaa36
@102 b450eb4
@103 b3f7b82
@104 b39f08f
@105 b346dc6
@106 b2ef312
@107 b298061
@108 b24159e
@109 b1eb2b6
@10a b195797
@10b b14042c
@10c b0eb867
@10d b097431
@10e b04377c
@10f aff0234
@110 af9d447
@111 af4ada6
@112 aef8e3e
@113 aea75ff
@114 ae564d7
@115 ae05aba
```

APPENDIX-continued

| | |
|---|---|
| @116 | adb5792 |
| @117 | ad65b52 |
| @118 | ad165ea |
| @119 | acc774b |
| @11a | ac78f63 |
| @11b | ac2ae27 |
| @11c | abdd383 |
| @11d | ab8ff6b |
| @11e | ab431d3 |
| @11f | aaf6aa7 |
| @120 | aaaa9dd |
| @121 | aa5ef64 |
| @122 | aa13b30 |
| @123 | a9c8d31 |
| @124 | a97e55c |
| @125 | a9343a3 |
| @126 | a8ea7f6 |
| @127 | a8a124b |
| @128 | a858295 |
| @129 | a80f8c5 |
| @12a | a7c74cf |
| @12b | a77f6a6 |
| @12c | a737e40 |
| @12d | a6f0b8e |
| @12e | a6a9e86 |
| @12f | a66371b |
| @130 | a61d540 |
| @131 | a5d78eb |
| @132 | a592212 |
| @133 | a54d0a6 |
| @134 | a50849e |
| @135 | a4c3ded |
| @136 | a47fc89 |
| @137 | a43c069 |
| @138 | a3f897f |
| @139 | a3b57c2 |
| @13a | a372b27 |
| @13b | a3303a4 |
| @13c | a2ee12e |
| @13d | a2ac3ba |
| @13e | a26ab42 |
| @13f | a2297b7 |
| @140 | a1e8911 |
| @141 | a1a7f48 |
| @142 | a167a50 |
| @143 | a127a20 |
| @144 | a0e7eb0 |
| @145 | a0a87f4 |
| @146 | a0695e5 |
| @147 | a02a878 |
| @148 | 9febfa6 |
| @149 | 9fadb65 |
| @14a | 9f6fbab |
| @14b | 9f32071 |
| @14c | 9ef49af |
| @14d | 9eb775a |
| @14e | 9e7a96b |
| @14f | 9e3dfd9 |
| @150 | 9e01a9c |
| @151 | 9dc59aa |
| @152 | 5d89cfe |
| @153 | 9d4e48e |
| @154 | 9d13055 |
| @155 | 9cd8045 |
| @156 | 9c9d45b |
| @157 | 9c62c8f |
| @158 | 9c288d7 |
| @159 | 9bee92e |
| @15a | 9bb4dab |
| @15b | 9b7b5e7 |
| @15c | 9b4223a |
| @15d | 9b0927d |
| @15e | 9ad06a9 |
| @15f | 9a97eb7 |
| @160 | 9a5faa1 |
| @161 | 9a27a5d |
| @162 | 99efde7 |
| @163 | 99b8537 |
| @164 | 9981044 |
| @165 | 9949f0e |
| @166 | 9913187 |
| @167 | 98dc7ac |
| @168 | 98a6174 |
| @169 | 986fedd |
| @16a | 9839fdd |
| @16b | 980446e |
| @16c | 97cec8b |
| @16d | 979982b |
| @16e | 976474c |
| @16f | 972f9e6 |
| @170 | 96faff2 |
| @171 | 96c696b |
| @172 | 969264a |
| @173 | 965e68b |
| @174 | 962aa27 |
| @175 | 95f7118 |
| @176 | 95c3b59 |
| @177 | 95908e3 |
| @178 | 955d9b2 |
| @179 | 952adc0 |
| @17a | 94f8508 |
| @17b | 94c5f83 |
| @17c | 9493d2e |
| @17d | 9461e01 |
| @17e | 94301f7 |
| @17f | 93fe90d |
| @180 | 93cd33d |
| @181 | 939c080 |
| @182 | 936b0d3 |
| @183 | 933a42e |
| @184 | 9309a90 |
| @185 | 92d93f2 |
| @186 | 92a904f |
| @187 | 9278fa2 |
| @188 | 92491e9 |
| @189 | 921971a |
| @18a | 91e9f33 |
| @18b | 91baa2f |
| @18c | 918b80a |
| @18d | 915c8c0 |
| @18e | 912dc4a |
| @18f | 90ff2a5 |
| @190 | 90d0bcd |
| @191 | 90a27bb |
| @192 | 907466d |
| @193 | 90467df |
| @194 | 9018c0b |
| @195 | 8feb2ee |
| @196 | 8fbdc83 |
| @197 | 8f908c5 |
| @198 | 8f637b0 |
| @199 | 8f36942 |
| @19a | 8f09d74 |
| @19b | 8edd445 |
| @19c | 8eb0dad |
| @19d | 8e849ac |
| @19e | 8e5883a |
| @19f | 8e2c957 |
| @1a0 | 8e00cfc |
| @1a1 | 8dd5326 |
| @1a2 | 8da9bd2 |
| @1a3 | 8d7e6fb |
| @1a4 | 8d534a0 |
| @1a5 | 8d284ba |
| @1a6 | 8cfd746 |
| @1a7 | 8cd2c40 |
| @1a8 | 8ca83a6 |
| @1a9 | 8c7dd73 |
| @1aa | 8c539a3 |
| @1ab | 8c29834 |
| @1ac | 8bff921 |
| @1ad | 8bd5c68 |
| @1ae | 8bac203 |
| @1af | 8b829f1 |
| @1b0 | 8b5942d |
| @1b1 | 8b300b5 |
| @1b2 | 8b06f84 |
| @1b3 | 8ade099 |

APPENDIX-continued

```
@1b4 8ab53ee
@1b5 8a8c980
@1b6 8a6414e
@1b7 8a3bb54
@1b8 8a1378c
@1b9 89eb5f6
@1ba 89c368d
@1bb 899b94f
@1bc 8973e39
@1bd 894c547
@1be 8924e76
@1bf 88fd9c3
@1c0 88d672b
@1c1 88af6ad
@1c2 8888843
@1c3 8861bea
@1c4 883b1a2
@1c5 8814966
@1c6 87ee333
@1c7 87c7f07
@1c8 B7a1cdf
@1c9 877bcb7
@1ca 8755e8e
@1cb 8730260
@1cc 870a82b
@1cd 86e4fed
@1ce 86bf9a1
@1cf 869a545
@1d0 86752d7
@1d1 8650255
@1d2 862b3bb
@1d3 8606707
@1d4 85e1c35
@1d5 85bd345
@1d6 8598c33
@1d7 85746fd
@1d8 85503a1
@1d9 852c219
@1da 8508267
@1db 84e4486
@1dc 84c0874
@1dd 849ce2f
@1de 84795b4
@1df 8455f02
@1e0 8432a15
@1e1 840f6ec
@1e2 83ec582
@1e3 83c95d8
@1e4 83a67e9
@1e5 8383bb5
@1e5 8361138
@1e7 833e873
@1e8 831c15f
@1e9 82f9bfc
@1ea 82d7849
@1eb 82b5641
@1ec 82935e4
@1ed 827172e
@1ee 824fa20
@1ef 822deb6
@1f0 820c4ec
@1f1 81eacc3
@1f2 81c9637
@1f3 81a8146
@1f4 8186df0
@1f5 8165c32
@1f6 8144c08
@1f7 8123d72
@1f8 810306d
@1f9 80e24f7
@1fa 80c1b0e
@1fb 80a12b3
@1fc 80a0bdf
@1fd 8060694
@1fe 80402ce
@1ff 802008c
```

What is claimed is:

1. A system for evaluating a rounded arithmetic expression comprising:
a plurality of tables populated with values to generate a piecewise monotonic function;
an arithmetic unit comprising non-iterative logic coupled to the plurality of tables, the arithmetic unit comprising an input and an output, the input to receive an operand and the output to provide a floating point result for the arithmetic expression comprising an accuracy to a Unit in the Last Place (ULP);
a register comprising an input coupled to the output of the arithmetic unit.

2. The system of claim 1, wherein the arithmetic expression is a reciprocal.

3. The system of claim 1, wherein the arithmetic expression is a square root reciprocal.

4. The system of claim 1, wherein the arithmetic expression is a square root.

5. An arithmetic processor comprising:
a lookup table system including first, second and third component tables configured to provide a first operand, a second operand, a third operand, and a square operand;
a first multiplier comprising an input to receive at least a first portion of an input operand, the first multiplier further coupled to the first component table to multiply the first operand and a square operand to provide a first result, the square operand determined responsively to the first portion of the input operand;
a second multiplier comprising an input to receive at least a second portion of the input operand, the second multiplier further coupled to the second component table to multiply the second operand and a multiplier operand to provide a second result, the multiplier operand determined responsively to the second portion of the input operand; and
an adding circuit configured to add the first result and the second result and the third operand, the third operand determined responsive to a third portion of the input operand to provide a third result;
a rounding circuit coupled to receive the third result and to provide a rounded result accurate to a unit in the last place.

6. The arithmetic processor, as recited in claim 5, further comprising:
a square table configured to provide the square operand.

7. The arithmetic processor, as recited in claim 6, wherein the entries in the square table are stored in a Booth recoded format.

8. The arithmetic processor, as recited in claim 5, further comprising:
a Booth recoder configured to provide the multiplier operand.

9. The arithmetic processor, as recited in claim 5, wherein the arithmetic processor is configured to provide a reciprocal value of an input operand.

10. The arithmetic processor, as recited in claim 5, wherein the arithmetic processor is configured to provide a square root value of an input operand.

11. The arithmetic processor as recited in claim 5, wherein the arithmetic processor is configured to provide a square root reciprocal value of an input operand.

12. The arithmetic processor, as recited in claim 5, wherein the first portion of the input operand comprises high order bits of the input operand.

13. The arithmetic processor, as recited in claim 12, wherein the first and second portions of the input operand are mutually exclusive with each other.

14. The arithmetic processor, as recited in claim 13, wherein the first and third portions of the input operand are mutually exclusive with each other.

15. The arithmetic processor, as recited in claim 14, wherein the second and third portions of the input operand overlap with each other.

* * * * *